United States Patent
Lin et al.

(10) Patent No.: US 7,779,412 B2
(45) Date of Patent: Aug. 17, 2010

(54) TASK SCHEDULING METHOD FOR LOW POWER DISSIPATION IN A SYSTEM CHIP

(75) Inventors: Yung-Chia Lin, Taipei (TW); Yi-Ping You, Taichung Hsien (TW); Chung-Wen Huang, Chia-Yi Hsien (TW); Jenq-Kuen Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1334 days.

(21) Appl. No.: 11/228,283

(22) Filed: Sep. 19, 2005

(65) Prior Publication Data
US 2006/0064696 A1    Mar. 23, 2006

(30) Foreign Application Priority Data
Sep. 21, 2004    (TW) ............................. 93128573 A

(51) Int. Cl.
G06F 9/46 (2006.01)
G06F 15/00 (2006.01)
G06F 15/16 (2006.01)
G06F 13/00 (2006.01)
G06F 17/50 (2006.01)
G06F 9/455 (2006.01)
G06F 1/00 (2006.01)

(52) U.S. Cl. .......................... 718/102; 712/1; 709/201; 710/100; 703/13; 703/28; 713/300

(58) Field of Classification Search ............... 710/100; 712/1; 709/201; 718/104–105; 703/13–28; 713/200
See application file for complete search history.

(56) References Cited

U.S. PATENT DOCUMENTS

| 6,097,886 | A  | * | 8/2000 | Dave et al. ............... 703/23 |
| 7,174,194 | B2 | * | 2/2007 | Chauvel et al. ............ 455/574 |
| 7,552,304 | B2 | * | 6/2009 | Marchal et al. ............ 711/170 |
| 2006/0101400 | A1 | * | 5/2006 | Capek et al. ............. 717/120 |
| 2007/0074216 | A1 | * | 3/2007 | Adachi et al. ............ 718/102 |
| 2007/0198971 | A1 | * | 8/2007 | Dasu et al. .............. 717/140 |

OTHER PUBLICATIONS

Lin, Yung-Chia et al. "Power-aware Scheduling for Parallel Security Processors with Analytical Models". Department of Computer Science, National Tsing-Hua University, Hsinchu, Taiwan. LCPC 2004.*

* cited by examiner

*Primary Examiner*—Meng-Ai An
*Assistant Examiner*—Adam Lee
(74) *Attorney, Agent, or Firm*—Fitzpatrick, Cella, Harper & Scinto

(57) ABSTRACT

A system chip includes a plurality of processing elements for performing primary computations of a plurality of tasks, a plurality of non-processing elements for controlling flow of data associated with the tasks among the processing elements, and a main controller including a scheduler, a resource allocation module, and a power management module. The scheduler assigns the tasks on the processing and non-processing elements with reference to time parameters of the processing and non-processing elements. The resource allocation module controls operations of the processing and non-processing elements with reference to task assignments determined by the scheduler. The power management module performs dynamic voltage management upon the processing and non-processing elements according to the scheduled tasks.

8 Claims, 4 Drawing Sheets

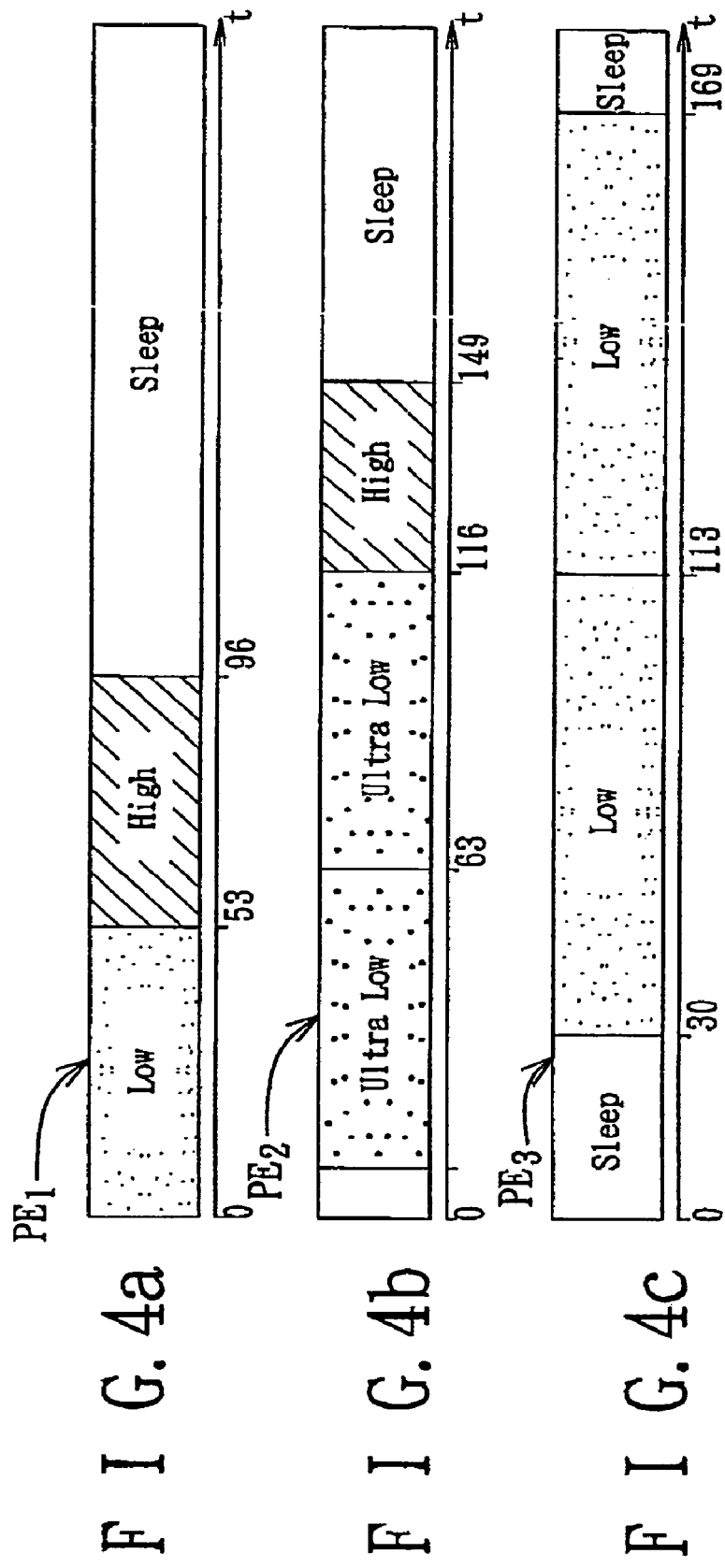

TASK SCHEDULING METHOD FOR LOW POWER DISSIPATION IN A SYSTEM CHIP

CROSS-REFERENCE TO RELATED APPLICATION

This application claims priority of Taiwanese application no. 093128573, filed on Sep. 21, 2004.

BACKGROUND OF THE INVENTION

1. Field of the Invention

The invention relates to a task scheduling method, more particularly to a task scheduling method for low power dissipation in a system chip.

2. Description of the Related Art

At present, mobile devices, such as mobile phones, personal digital assistants (PDAs), etc., are in wide use. However, while these devices require numerous transistors in a System-on-a-Chip (SOC) so as to achieve the purposes of lightweight and compact dimensions, the large number of transistors or logic gates results in escalation in power dissipation. If the problem of power dissipation is not resolved, prolonged use of the mobile devices can result in instability due to overheating of the same.

Power dissipation in electronic components may be attributed mainly to static power dissipation caused by leakage current loss in a complementary metal-oxide-semiconductor (CMOS) circuit, or dynamic power dissipation caused by switching transient currents and charging/discharging of capacitive loads.

The following equation is used for static power dissipation ($P_{static}$) estimation:

$$P_{static} = V_{dd} \times N \times k_{design} \times I_{leakage} \quad \text{Equation (1)}$$

wherein $V_{dd}$ is an input transistor voltage, N is the number of transistors, $k_{design}$ is a design-dependent constant, and $I_{leakage}$ is the leakage current caused by reverse bias leakage of the integrated circuit.

The following equations are used for dynamic power dissipation ($P_{dynamic}$) estimation:

$$P_{dynamic} = C \times \alpha \times f \times (V_{dd})^2 \quad \text{Equation (2)}$$

$$f = k \times (V_{dd} - V_t)^2 / V_{dd} \quad \text{Equation (3)}$$

wherein f is the operating clock frequency, C is the load capacitance, $\alpha$ is the switching activity, k is a circuit-dependent constant, $V_{dd}$ is an input transistor voltage, and $v_t$ is the threshold voltage.

Due to the aforesaid factors of static and dynamic power dissipation existing in transistors of a system chip, it is very critical to lower downpower consumption of the system chip. Through the design of low-power circuits and dynamic power management, a system chip can be prevented from reaching high temperatures or even overheating under normal operating conditions so as to reduce the problem of heat dissipation. Hence, manufacturers need not incur additional expense during chip packaging for overcoming the heat-dissipation problem of system chips while enhancing circuit reliability and prolonging the service lives of the system chips.

To reduce power consumption of a system chip, many research papers and patents in the field of variable voltage scheduling techniques are available. For instance, "Task scheduling for low-energy systems using variable supply voltage processor" made public in the Asia and South Pacific Design Automation Conference (ASPDAC) in 2001, and "Variable voltage task scheduling for minimizing energy or minimizing power" made public in the International Conference on Acoustics Speech, Signal Processing (ICASSP) in 2000 both proposed task scheduling methods and devices for low power dissipation through dynamic voltage scaling for lowering down the overall energy consumption of a system chip.

U.S. Pat. No. 5,831,864, titled "Design tools for high-level synthesis of a low-power data path", and U.S. patent Publication No. 2003/0217090, titled "Energy-aware scheduling of Application execution", disclose data paths and principles for scheduling tasks associated with the lowest power dissipation on multiple processing elements (PEs). In U.S. patent Publication No. 2003/0217090, there is disclosed a mobile device that manages tasks using a scheduler for scheduling tasks on multiple processors. The scheduling method involves initial scheduling of tasks based primarily on energy consumption criteria, then dispatching the tasks to different processors according to the deadlines thereof so as to obtain an optimum scheduling result with lowest power dissipation.

Nevertheless, the prior art only disclose methods for scheduling tasks on different PEs of a system chip to minimize power consumption of the PEs. The applicants are unaware of any prior art that also takes into consideration non-PEs, such as I/O interfaces, control circuits, etc., of a system chip during task scheduling. It is well known in the art that, during execution of tasks, the task processing efficiency is dependent upon the relationships between PER and non-PEs. Therefore, if task scheduling only took PEs of the system chip into consideration and excluded all non-PEs, the estimated result of overall power dissipation of the system chip is most likely to be imprecise.

SUMMARY OF THE INVENTION

Therefore, the main object of the present invention is to provide a task scheduling method in which processing and non-processing elements of a system chip are taken into consideration during task scheduling to ensure low overall power dissipation of the system chip.

Another object of the present invention is to provide a system chip which implement the task scheduling method of this invention.

According to one aspect of the present invention, there is provided a task scheduling method for scheduling tasks on a system chip that includes a plurality of processing elements and a plurality of non-processing elements on which the tasks are to be executed. The task scheduling method comprises the steps of:

a) performing initial scheduling of the tasks on the processing elements under a condition that the non-processing elements operate at full power states;

b) establishing an analytical model for the processing and non-processing elements, and estimating time parameters of the tasks on the processing and non-processing elements from the analytical model;

c) determining lowest possible power dissipation and timing sequence of the tasks on the non-processing elements according to the analytical model established in step b);

d) generating task scheduling results for the processing elements with reference to values obtained in step c); and e) repeating steps c) and d) until the task scheduling results converge to an invariable scheduling result.

According to another aspect of the present invention, there is provided a task scheduling method for scheduling tasks on a system chip that includes a plurality of processing elements and a plurality of non-processing elements on which the tasks are to be executed, a scheduler, a resource allocation module, and a power management module. The task scheduling method comprises the steps of:

a) enabling the scheduler to analyze time parameters of the processing and non-processing elements, to assign the tasks on the processing and non-processing elements with reference to the time parameters, and to determine a task scheduling result with a lowest possible power dissipation;

b) enabling the resource allocation module to control operations of the processing and non-processing elements with reference to the task scheduling result determined by the scheduler; and c) enabling the power management module to perform dynamic voltage management upon the processing and non-processing elements according to the scheduled tasks.

According to yet another aspect of the present invention, there is provided a system chip that comprises a plurality of processing elements for performing primary computations of a plurality of tasks, a plurality of non-processing elements for controlling flow of data associated with the tasks among the processing elements, and a main controller including a scheduler, a resource allocation module, and a power management module.

The scheduler assigns the tasks on the processing and non-processing elements with reference to time parameters of the processing and non-processing elements. The resource allocation module controls operations of the processing and non-processing elements with reference to task assignments determined by the scheduler. The power management module performs dynamic voltage management upon the processing and non-processing elements according to the scheduled tasks.

BRIEF DESCRIPTION OF THE DRAWINGS

Other features and advantages of the present invention will become apparent in the following detailed description of the preferred embodiment with reference to the accompanying drawings, of which:

FIGS. 4a to 4c illustrate exemplary voltage assignments for three different processing elements of a system chip, the assignments being obtained through the task scheduling method of the present invention.

DETAILED DESCRIPTION OF THE PREFERRED EMBODIMENT

Figure 1:
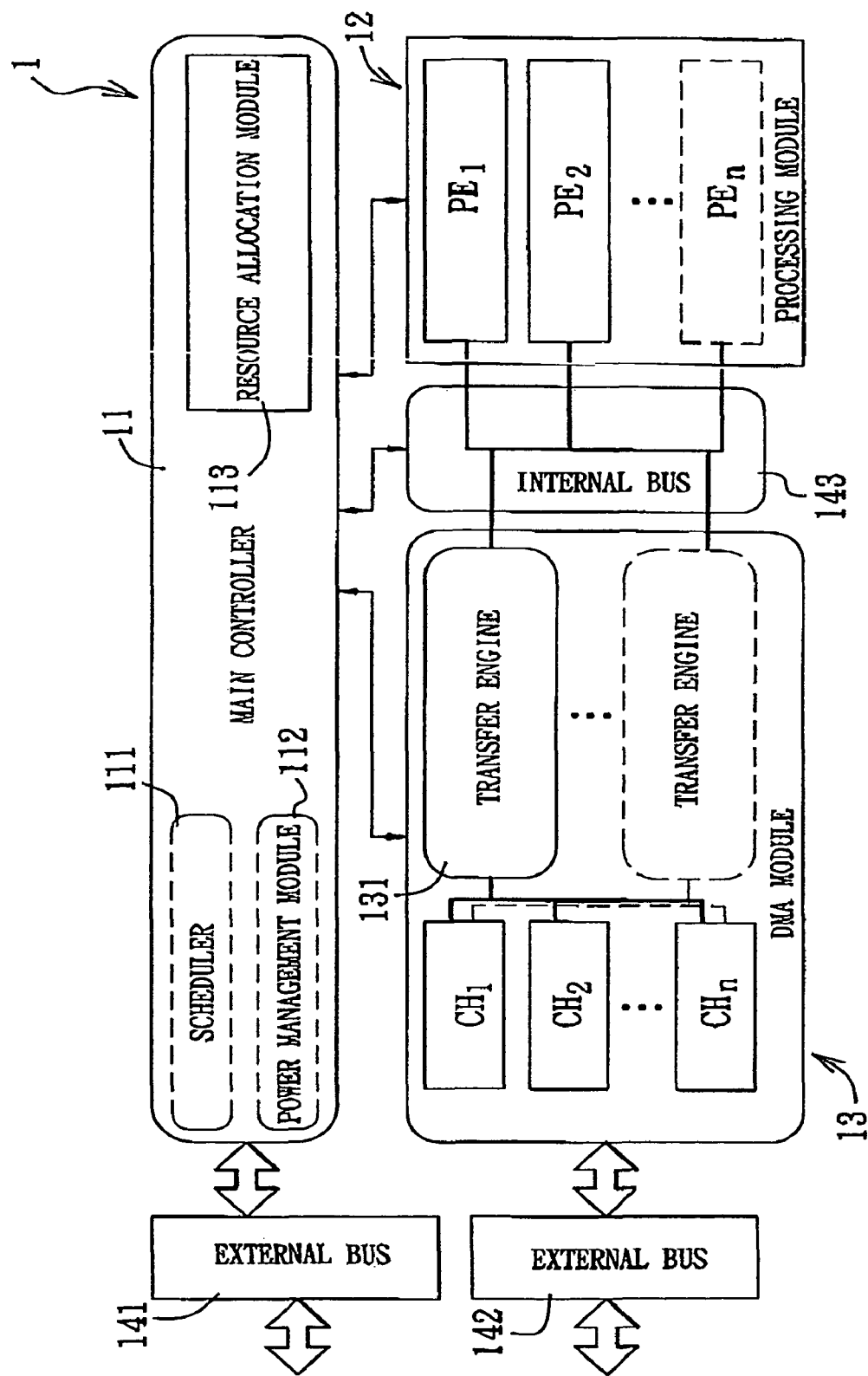
FIG. 1 is a system block diagram illustrating a preferred embodiment of a system chip that implements a task scheduling method according to the present invention.

Referring to FIG. 1, a system chip 1 that implements the preferred embodiment of a task scheduling method according to the present invention is shown to be embodied in an encryption/decryption semiconductor chip that can execute a variety of tasks, such as data encryption/decryption, interrupt servicing, etc. Each task can be executed independently or simultaneously with other tasks. The contents to be processed can include steps of different forms of encryption/decryption. However, it can be readily appreciated by those skilled in the design of system chips that the task scheduling method for low power dissipation of this invention should not be limited for application to the aforesaid encryption/decryption chip since it may also be applied to other types of chips that include similar components.

It should be noted that the method is based on the assumption that the system chip 1 not only includes processing elements (PEs) that have characteristics of dynamic voltage scaling (DVS) and power gating (PG), but also includes non-processing elements (Non-PEs) that have the same characteristics. Moreover, the task scheduling method for low power dissipation according to this invention may be implemented using a computer readable storage medium that includes a plurality of computer program codes to be loaded into a computer so as to enable the latter to execute the method of this invention. The software format enables a chip designer to perform circuit simulation. Alternatively, implementation of the method of this invention may be conducted using a dedicated circuit or a programmed module embedded in the system chip 1, thereby enabling the latter to perform task analysis and scheduling in real-time.

In this embodiment, the system chip 1 includes a main controller 11, a processing module 12, a DMA module 13, a pair of external buses 141, 142, and an internal bus 143. The main controller 11 includes a scheduler 111, a power management module 112, and a resource allocation module 113.

It should be apparent to those skilled in the art that the scheduler 111 may be fabricated as a hardware component or implemented as a programmed module built into the main controller 11. Alternatively, the operating system (OS) of an external central processing unit (CPU) or an external program may be relied upon to provide the requisite scheduling function. In addition, a static method, in which task scheduling results are obtained after offline processing, is also within the scope of the task scheduling method for low power dissipation according to this invention.

The processing module 12 includes a plurality of processing elements $PE_1 \sim PE_n$. In the prior art, optimum power consumption analysis is performed to assign the tasks on the processing elements $PE_1 \sim PE_n$. Since the processing times of the processing elements $PE_1 \sim PE_n$ are different, each of the processing element $PE_1 \sim PE_n$ notifies the main controller 11 whenever a respective operation is finished thereby.

The DMA module 13 includes a plurality of channels $CH_1 \sim CH_n$, and a plurality of transfer engines 131. The external buses 141, 142 and the internal bus 143 are used to receive data. According to data content in the channels $CH_1 \sim CH_m$, the transfer engines 131 request the external buses 141, 142 to transfer data from memory. The transfer engines 131 then pass the data to the processing elements $PE_1 \sim PE_n$ via the internal bus 143. Preferably, the internal bus 143 is designed to support high-speed data transmission.

The power management module 112 can adjust magnitude of the operating voltage of the various components in the system chip 1 through software control. There are four power states available for all of the components in the system chip 1: High (or Full), Low, Ultra low, and Sleep. In conjunction with the scheduler 111, the tasks on the various components can be further assigned any of the aforesaid power states.

As evident from Equations (2) and (3) described hereinabove, when the input voltage ($V_{dd}$) of a component becomes higher, the dynamic power dissipation ($P_{dynamic}$) of the component becomes higher. In the same manner, when the operating clock frequency (f) of a component becomes higher, the dynamic power dissipation ($P_{dynamic}$) of the component becomes higher as well. Therefore, when the power state of a component is High, the dynamic power dissipation ($P_{dynamic}$) of the component is the highest accordingly. In the same manner, when the power state of a component is Low or Ultra low, the dynamic power dissipation ($P_{dynamic}$) of the component is decreased. The dynamic power dissipation ($P_{dynamic}$) is reduced to a minimum when the component power state is Sleep since no operation is being performed. When the loading of tasks to be processed is heavy, the power management module 112 adjusts the power states to the High power state such that the processing rate and efficiency of each component becomes faster. In this manner, the system chip 1 is able to adjust the power states according to the loading of tasks so as to achieve an effect of lower power dissipation.

Figure 2:
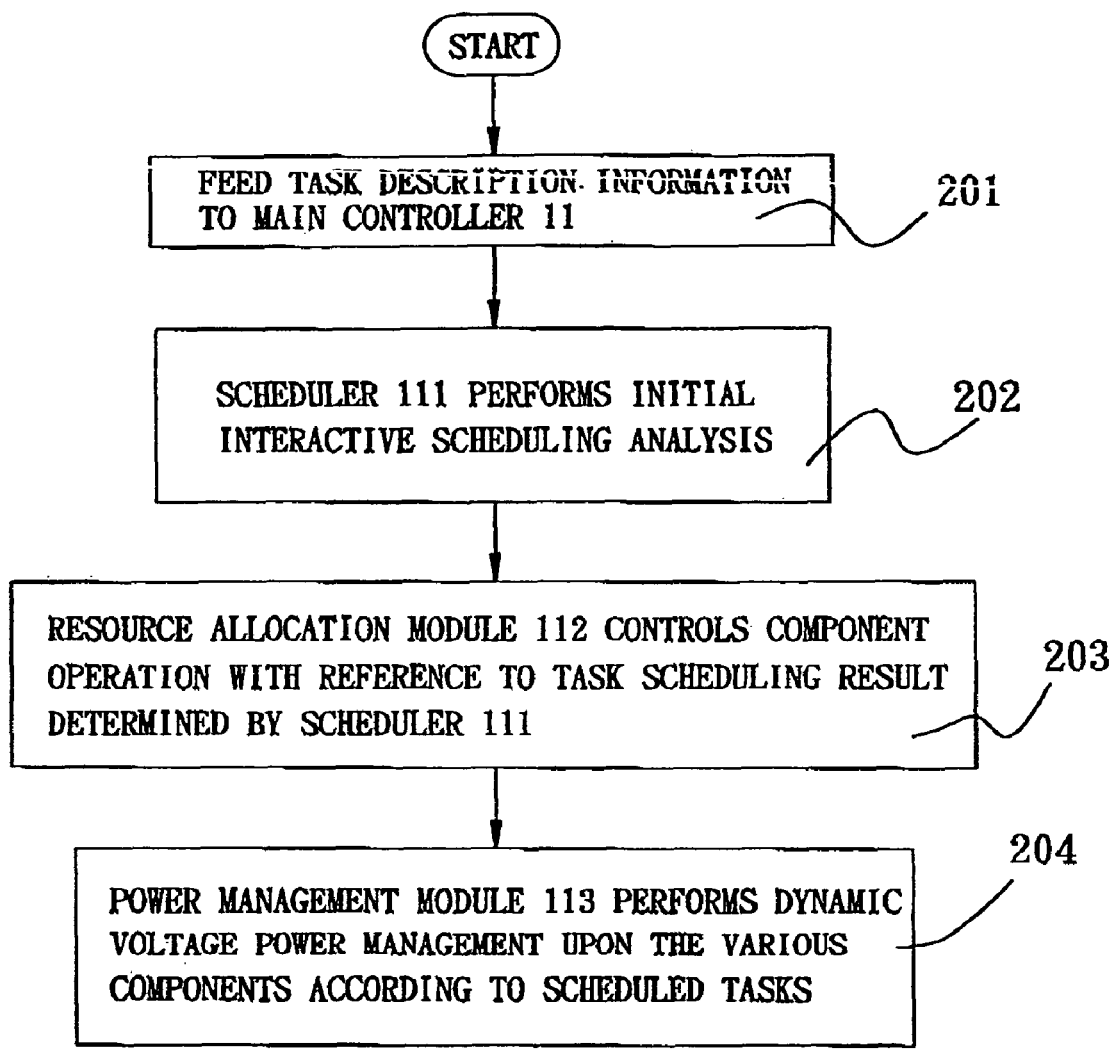
FIG. 2 is a flowchart to illustrate how the various components of the system chip of FIG. 1 operate according to this invention.

Referring to FIGS. 1 and 2, how the various components of the system chip 1 operate according to this invention will now be described in the succeeding paragraphs.

Step 201: First, description information of each task is fed to the main controller 11 via the external bus 141.

Step 202: With reference to the description information, the scheduler 111 performs initial interactive scheduling analysis for the tasks to be scheduled through the use of an analytical model. This will be described in greater detail in the succeeding paragraphs.

Step 203: With reference to the task scheduling result determined by the scheduler 111, the resource allocation module 113 controls operations of the various components. In this step, the DMA module 13 is activated such that data for each task flows to the corresponding component for processing in accordance with the task scheduling result, in which the component can be any of the processing elements (PEs) and the Non-PEs, such as the DMA module 13, the external buses 141, 142, the internal bus 143, etc.

Step 204: During actual execution of each task, the power management module 113 performs dynamic voltage management upon the various components according to the scheduled tasks.

The analytical model of the task scheduling method for low power dissipation according to this invention will now be described in greater detail hereinafter.

In the following Equation (4), for a unit time period, it is assumed that the processing time spent on waiting for the processing elements (PEs) is $$\sum_{k=1}^{l} \Omega_{k,i},$$

the processing time spent on waiting for the non-processing elements (Non-PEs) is $$\sum_{j=1}^{m} \Omega'_{j,i},$$

and that other time not spent on the processing and non-processing elements, such as memory access time, transfer times of the external buses 141, 142, initialization of the main controller 11, activation delay of the transfer engines 131, etc., is $\Phi$. Equation (4) describes the fraction of time relation among the various components within a unit time period. If the total is 1, when two parts of the time relation are known, the remaining part of the time relation can be deduced.

$$\Phi_i + \sum_{k=1}^{l} \Omega_{k,i} + \sum_{j=1}^{m} \Omega'_{j,i} = 1 \qquad \text{Equation (4)}$$

As evident from Equation (4), from the processing time spent on waiting for the processing elements (PEs)

$$\sum_{k=1}^{l} \Omega_{k,i}$$

and the processing time spent on waiting for the non-processing elements (Non-PEs)

$$\sum_{j=1}^{m} \Omega'_{j,i},$$

the average latency time attributed to the Non-PEs may be estimated for scheduling planning based on the result.

The following stabilizing conditions are set for system scheduling: Rate for entering the processing elements equals rate for actual processing by the processing elements; and Total input/output data rate of the processing elements equals total transmission rate within the internal bus 143.

Figure 3:
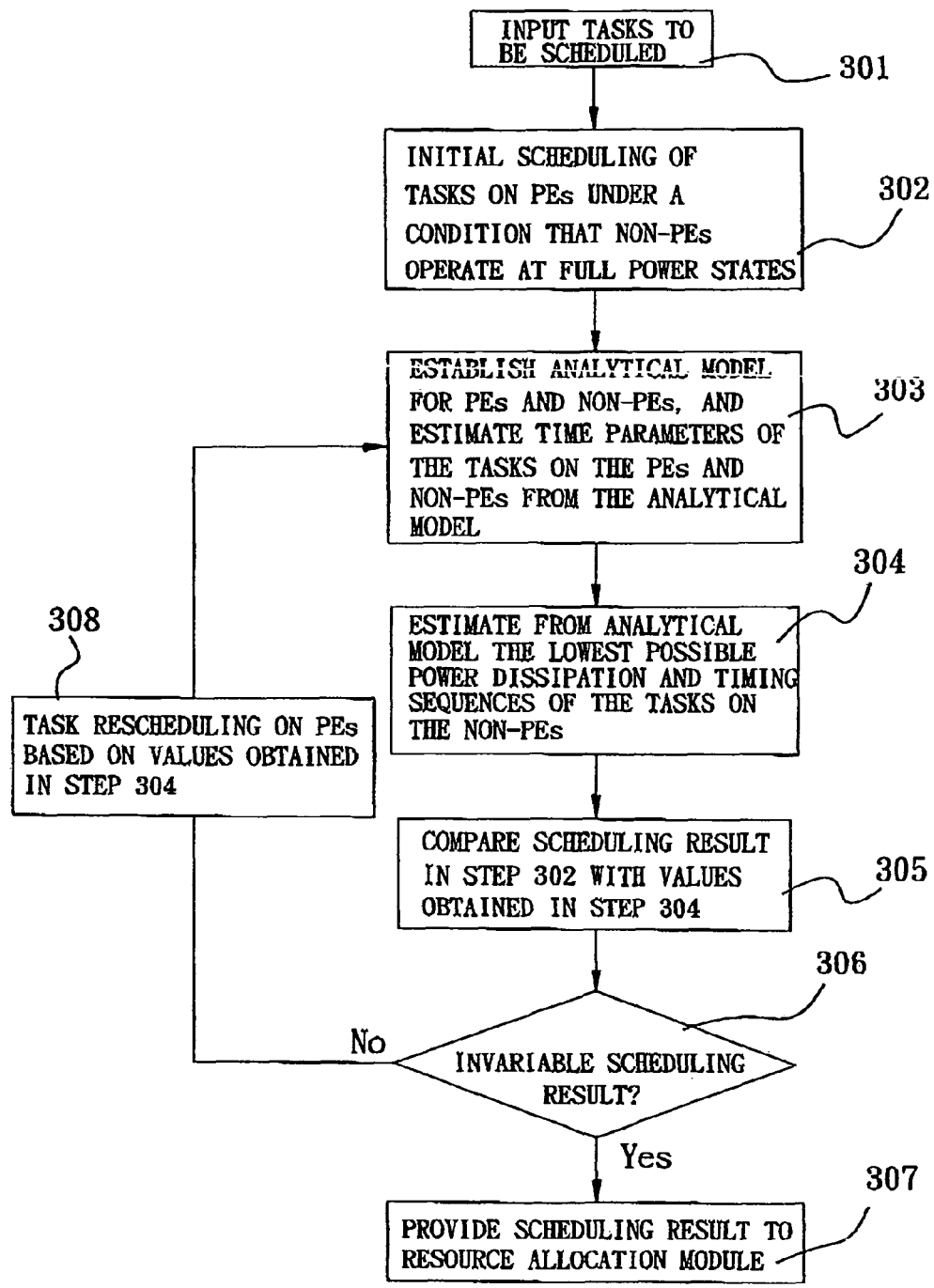
FIG. 3 is a flowchart to illustrate a preferred embodiment of a task scheduling method according to the present invention.

FIG. 3 is a flowchart to illustrate the preferred embodiment of the task scheduling method according to the present invention. In this embodiment, the channels $CH_1$~$CH_m$ and the internal bus 143 are used as Non-PEs. The task scheduling method can be generally subdivided into three stages;

The first stage—In step 301, the tasks to be scheduled are inputted. Then, in step 302, initial scheduling of the tasks on the processing elements $PE_1$~$PE_n$ is performed. In this step, the operating voltages of the processing elements $PE_1$~$PE_n$ are determined under a condition that the Non-PEs operate at full power states for maximum performance, and the scheduler 111 assigns the tasks on the processing elements $PE_1$~$PE_n$ according to a first-come, first-served scheduling rule with reference to inspected deadlines of the various tasks.

Since the principle of assigning tasks based on a first-come, first-served scheduling rule is known in the art and is not the main feature of the invention, a detailed description of the same will be omitted herein for the sake of brevity.

The second stage—In step 303, an analytical model for the processing elements $PE_1$~$PE_n$ and the non-processing elements is established, and time parameters of the tasks on the processing elements $PE_1$~$PE_n$ and the non-processing elements are estimated from the analytical model. In this step, the latency of processing efficiency of the processing elements $PE_1$~$PE_n$ attributed to the other non-processing elements is evaluated. The factors that affect such latency include power dissipation and time parameters.

Thereafter, in step 304, from the analytical model, the effect of the Non-PEs (i.e., the channels $CH_1$~$CH_m$ and the internal bus 143) is determined for estimating the lowest power dissipation and timing sequence of the tasks on the Non-PEs. In this step, operating voltages for the channels $CH_1$~$CH_m$ and the internal bus 143 are determined, and the average time spent by the Non-PEs on the tasks are calculated as well. Then, in step 305, the scheduling result obtained in step 302 is compared with the values obtained in step 304.

The third stage—in step 306, it is determined if an invariable scheduling result has been obtained. If the task scheduling results do not converge to an invariable scheduling result, the flow goes to step 308, in which the tasks are rescheduled on the processing elements $PE_1 \sim PE_n$ with reference to the values obtained in step 304. That is, the scheduler 111 performs iterative interactive analysis by repeating steps 303 to 305 until the task scheduling results converge to an invariable scheduling result. The invariable scheduling result in then provided to the resource allocation module 113 in step 307.

The following example is provided to illustrate the effect of the task scheduling method of this invention. In the example, the system chip 1 has three processing elements ($PE_1 \sim PE_3$), two internal buses ($IBUS_1$, $IBUS_2$), and three channels ($CH_1 \sim CH_3$). There are eight tasks ($T_1 \sim T_8$) to be executed. Each task has a respective arrival time, deadline time and execution time in the full power state as shown in the following Table 1:

TABLE 1

| task | arrival time | deadline time | execution time |
|---|---|---|---|
| $T_1$ | 0 | 100 | 20 |
| $T_2$ | 0 | 100 | 20 |
| $T_3$ | 0 | 100 | 20 |
| $T_4$ | 10 | 150 | 10 |
| $T_5$ | 10 | 150 | 10 |
| $T_6$ | 10 | 150 | 10 |
| $T_7$ | 30 | 200 | 30 |
| $T_8$ | 30 | 200 | 30 |

Description information of the tasks ($T_1 \sim T_8$) to be scheduled is inputted to the scheduler 111 that performs initial scheduling on a first-come, first-served basis. The Non-PEs (i.e., the two internal buses $IBUS_1$, $IEUS_2$, and the three channels $CH_1 \sim CH_3$) are first set to be in their full power states, and the operating voltages of each task over the processing elements are obtained. The initial scheduling results are shown in the following Table 2:

TABLE 2

| task | start time | processing element | operating voltage | deadline time | execution time |
|---|---|---|---|---|---|
| $T_1$ | 0 | $PE_1$ | Low | 50 | 50 |
| $T_2$ | 50 | $PE_1$ | Full | 20 | 70 |
| $T_3$ | 70 | $PE_1$ | Full | 20 | 90 |
| $T_4$ | 10 | $PE_2$ | ultra low | 50 | 60 |
| $T_5$ | 60 | $PE_2$ | ultra low | 50 | 110 |
| $T_6$ | 110 | $PE_2$ | Low | 30 | 140 |
| $T_7$ | 30 | $PE_3$ | Low | 80 | 110 |
| $T_8$ | 110 | $PE_3$ | Low | 80 | 190 |

Then, an analytical model for the processing elements ($PE_1 \sim PE_3$), the buses ($IBUS_1$, $IBUS_2$), and the channels ($CH_1 \sim CH_3$) is established. Time parameters are estimated based on the analytical model so as to determine the lowest possible power dissipation and the timing sequence of the tasks ($T_1 \sim T_8$) on the buses ($IBUS_1$, $IBUS_2$) and the channels ($CH_1 \sim CH_3$). The power states of the buses ($IBUS_1$, $IBUS_2$) and the channels ($CH_1 - CH_3$) thus obtained are shown in the: following Table 3:

| Non-processing element | Power state |
|---|---|
| $IBUS_1$ | low |
| $IBUS_1$ | low |
| $CH_1$ | low |

-continued

| Non-processing element | Power state |
|---|---|
| $CH_2$ | low |
| $CH_3$ | low |

Based on the power states of the buses ($IBUS_1$, $IBUS_2$) and the channels ($CH_1 \sim CH_3$) listed in Table 3, the time spent on the buses ($IBUS_1$, $IBUS_2$) and the channels ($CH_1 \sim CH_3$) during servicing of each task ($T_1 \sim T_8$) is calculated and reported to the scheduler 111. The scheduler 111 then determines new operating voltages for the tasks ($T_1$-$T_8$) on the processing elements ($PE_1 \sim PE_3$) to achieve the object of lower power dissipation, as shown in the following Table 4:

TABLE 4

| task | start time | processing element | operating voltage | deadline time | execution time |
|---|---|---|---|---|---|
| $T_1$ | 0 | $PE_1$ | low | 53 | 53 |
| $T_2$ | 53 | $PE_1$ | full | 23 | 76 |
| $T_3$ | 76 | $PE_1$ | full | 23 | 99 |
| $T_4$ | 10 | $PE_2$ | ultra low | 53 | 63 |
| $T_5$ | 63 | $PE_2$ | ultra low | 53 | 116 |
| $T_6$ | 116 | $PE_2$ | low | 33 | 149 |
| $T_7$ | 30 | $PE_3$ | low | 83 | 113 |
| $T_8$ | 113 | $PE_3$ | low | 83 | 199 |

As shown in FIGS. 4a, 4b and 4c, after iterative interactive scheduling analysis, the following invariable scheduling result is obtained:

1. The processing element ($PE_1$) processes tasks ($T_1 \sim T_3$) After processing task ($T_1$), the power state of the processing element ($PE_1$) changes from low to high and then to sleep.

2. The processing element ($PE_2$) processes tasks ($T_4 \sim T_6$) After processing tasks ($T_4$, $T_5$), the power state of the processing element ($PE_2$) changes from ultra low to high and then to sleep.

3. The processing element ($PE_3$) processes tasks ($T_7 \sim T_8$) The power state of the processing element ($PE_3$) changes from sleep to low and then back to sleep.

In sum, in a complicated system chip, whenever a task is processed in a processing element, a certain amount of time must be spent on an associated non-processing element. In the prior art, the effect of the non-processing elements over the scheduling of tasks on the processing elements is ignored such that the estimated power dissipation of the entire system chip is inaccurate. Since the task scheduling method of this invention takes into account both processing and non-processing elements of the system chip during task scheduling, lower power dissipation can be achieved accordingly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A task scheduling method for scheduling tasks on a system chip that includes a plurality of processing elements and a plurality of non-processing elements on which the tasks are to be executed, said task scheduling method comprising the steps of:

a) performing initial scheduling of the tasks on the processing elements under a condition that the non-processing elements operate at full power states;

b) establishing an analytical model for the processing and non-processing elements, and estimating time parameters of the tasks on the processing and non-processing elements from the analytical model, wherein the time parameters correspond to the processing times of the tasks on assigned ones of the processing and non-processing elements;

c) determining lowest possible power dissipation and timing sequence of the tasks on the non-processing elements according to the analytical model established in step b);

d) generating task scheduling results for the processing elements with reference to values obtained in step c); and e) repeating steps c) and d) until the task scheduling results converge to an invariable scheduling result.

2. The task scheduling method as claimed in claim 1, wherein, in step a), the tasks are scheduled on the processing elements in a first-come, first-served manner.

3. A computer program stored on a computer-readable medium, comprising program instructions for causing a computer to perform consecutively the task scheduling method steps as claimed in claim 1.

4. A task scheduling method for scheduling tasks on a system chip that includes:

a plurality of processing elements and a plurality of non-processing elements on which the tasks are to be executed, a scheduler, a resource allocation module, and a power management module, said task scheduling method comprising the steps of:

a) enabling the scheduler to analyze time parameters of the processing and non-processing elements, to assign the tasks on the processing and non-processing elements with reference to the time parameters, and to determine a task scheduling result with a lowest possible power dissipation, wherein the time parameters correspond to the processing times of the tasks on assigned ones of the processing and non-processing elements;

b) enabling the resource allocation module to control operations of the processing and non-processing elements with reference to the task scheduling result determined by the scheduler; and c) enabling the power management module to perform dynamic voltage management upon the processing and non-processing elements according to the scheduled tasks.

5. The task scheduling method as claimed in claim 4, wherein, in step a), the scheduler performs iterative interactive analysis to determine the task scheduling result.

6. A computer program stored on a computer-readable medium, comprising program instructions for causing a computer to perform consecutively the task scheduling method steps as claimed in claim 4.

7. A system chip comprising:

a plurality of processing elements for performing primary computations of a plurality of tasks;

a plurality of non-processing elements for controlling flow of data associated with the tasks among said processing elements; and a main controller including a scheduler, a resource allocation module, and a power management module, said scheduler assigning the tasks on the processing and non-processing elements with reference to time parameters of the processing and non-processing elements, wherein the parameters correspond to the processing times of the tasks on assigned ones of the processing and non-processing elements, said resource allocation module controlling operations of said processing and non-processing elements with reference to task assignments determined by said scheduler, said power management module performing dynamic voltage management upon said processing and non-processing elements according to the scheduled tasks, wherein said scheduler performs iterative interactive analysis to determine a task scheduling result having lowest possible power dissipation.

8. The system chip as claimed in claim 7, wherein said non-processing elements include at least one of an internal bus and a data channel.

* * * * *